Figure 1:
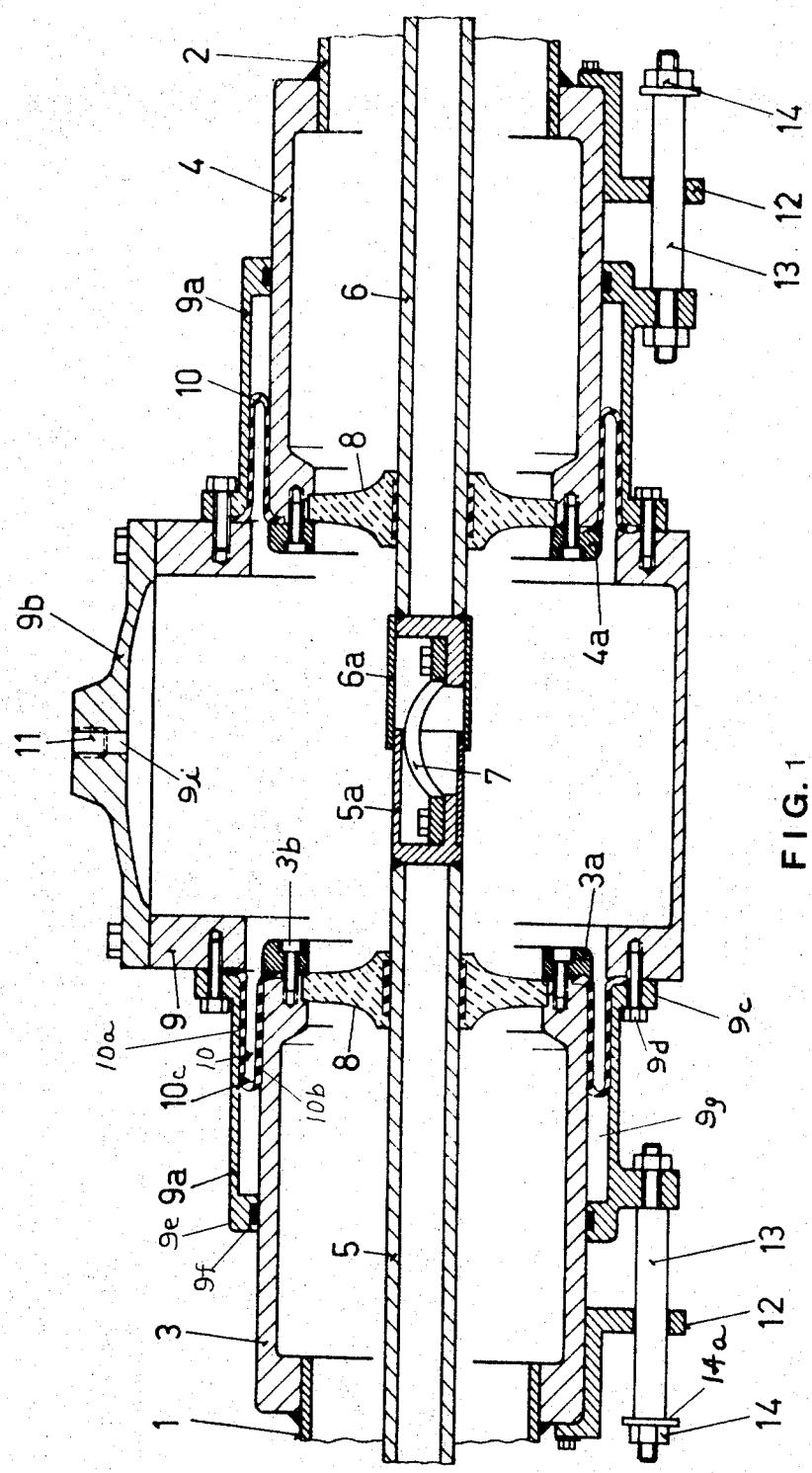

United States Patent [19]
Floessel

[11] 3,786,170
[45] Jan. 15, 1974

[54] INSULATION GAS FILLED ENCAPSULATED HIGH VOLTAGE ELECTRICAL CONDUCTOR

[75] Inventor: Dieter Floessel, Fislisbach, Switzerland

[73] Assignee: Brown Boveri & Company Limited, Baden, Switzerland

[22] Filed: July 12, 1972

[21] Appl. No.: 271,003

[30] Foreign Application Priority Data
Sept. 8, 1971 Switzerland.................... 13097/71
Sept. 24, 1971 Switzerland.................... 13994/71

[52] U.S. Cl................ 174/28, 174/13, 174/16 B, 174/99 B, 285/224
[51] Int. Cl. ............................................. H01b 9/01
[58] Field of Search................ 174/13, 21 R, 21 C, 174/21 CA, 22 R, 22 C, 25 G, 28, 16 B, 99 B, 88 B, 99 E, 99 R, 86; 339/9 E; 285/224, 223, 225, 229, 138, 111

[56] References Cited
UNITED STATES PATENTS

| | | | |
|---|---|---|---|
| 3,569,606 | 3/1971 | Clin...................................... | 174/16 B |
| 3,376,052 | 4/1968 | Zimmerer et al............... | 285/111 X |
| 2,841,419 | 7/1958 | Jay...................................... | 285/225 |
| 409,183 | 8/1889 | De Ferranti........................ | 174/13 |
| 2,331,932 | 10/1943 | Rowand........................... | 285/229 X |
| 3,400,952 | 9/1968 | Swenson et al................. | 285/229 X |
| 1,015,180 | 1/1912 | Heitman........................... | 285/229 X |

Primary Examiner—Bernard A. Gilheany
Assistant Examiner—A. T. Grimley
Attorney—Ralph E. Parker et al.

[57] ABSTRACT

An encapsulated high-voltage conductor structure in which the conductor is supported centrally within a grounded tubular casing by means of insulators, the casing being filled with a pressurized insulating gas and being divided in sections which are coupled together in essentially end-to-end relation by means of coupling joints which provide compensation for temperature-induced expansion and contraction of the casing sections. Each coupling joint is provided by a housing including oppositely extending coupling sleeves into which the ends of adjoining casing sections are inserted for sliding, guiding movement as the sections expand or contract, there being interposed in an annular gap provided between the end of each casing section and the associated coupling sleeve a sealing means in the form of a flexible tube turned back upon itself which accommodates the relative longitudinal displacement between the casing section and its coupling sleeve.

10 Claims, 3 Drawing Figures

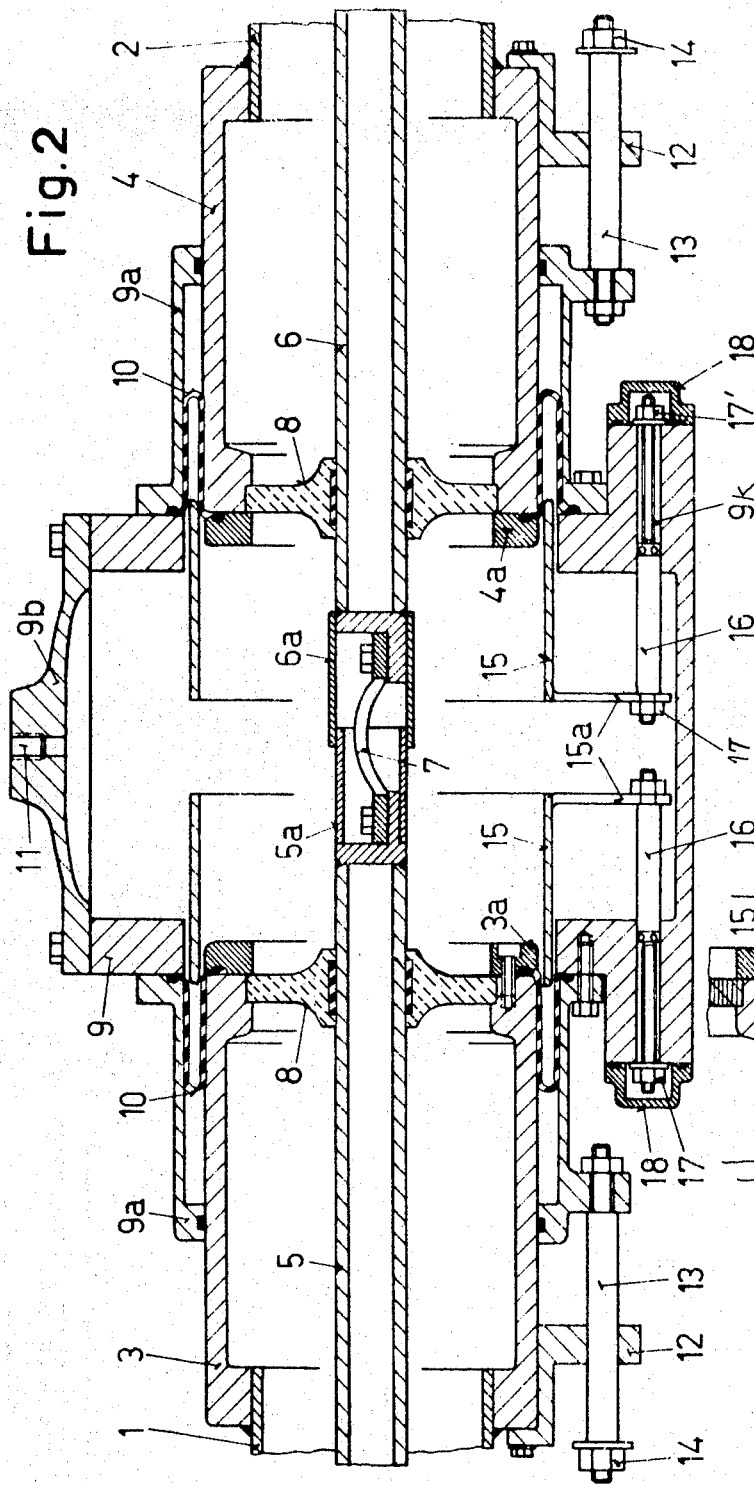

INSULATION GAS FILLED ENCAPSULATED HIGH VOLTAGE ELECTRICAL CONDUCTOR

The present invention relates to an improved construction for encapsulated high-voltage conductors wherein the conductor is supported centrally within a grounded tubular casing by means of insulators, the casing being filled with an insulating gas and being divided longitudinally into sections which are coupled together in essentially end-to-end relation by means of coupling joints which provide compensation for temperature-induced expansion and contraction of the casing sections.

In the case of gas-tight encapsulating casings for high voltage conductors serving as bus-bars, it is known to provide expansion joints in the form of folded bellows between adjoining casing sections to compensate for temperature-induced expansion and contraction of the sections. One such arrangement is disclosed in the German published application 1,515,367. However, this arrangement is relatively expensive and complicated, and especially so because the folded bellows are required to have a diameter substantially equal to the large diameter of the casing sections. Moreover, such bellows possess a relatively small expansion capacity when designed for great internal gas pressures.

The primary objective of the present invention is to provide an improved expansion joint construction which will provide a relatively large dilation at relative small expense, with the result that the number of expansion joints required for a given length of encased conductor structure can be reduced considerably in comparison with the expansion joint structures previously developed for this purpose.

The objective of the invention is attained by means of a coupling housing provided between adjacent sections of the casing enclosing the high voltage conductor, and which includes oppositely extending coupling sleeves into which the ends of the casing sections are inserted for sliding, guiding movement as the sections expand or contract, there being interposed in an annular gap provided between the ends of the casing sections and the coupling sleeves a sealing means in the form of a flexible tube turned back upon itself.

A preferred embodiment of the invention will now be described and is illustrated in the accompanying drawings wherein:

FIG. 1 is view in central longitudinal section of the end portions of two casing sections enclosing the high voltage conductor and which are joined together by means of the improved coupling housing in accordance with the invention;

FIG. 2 is a view similar to FIG. 1 but which includes a modification in the form of a support sleeve arrangement for the flexible sealing tube which prevents the latter from undergoing an inversion which could be caused by external air pressure during evacuation of the casing prior to introduction of the insulating gas therein; and FIG. 2a is a detail of FIG. 2 showing the support sleeve inserted into the fold between the inner and outer portions of the flexible tube at the time of evacuation of the casing to prevent any longitudinal movement of the rolled back end of the tube.

With reference now to FIG. 1, it will be seen that the grounded casing for the high voltage conductor is sectionalized into rectilinear cylindrical tubular sections 1 and 2 which are coupled together by a coupling housing structure 9. The high voltage conductor located centrally within the casing sections 1, 2 likewise consists of rectilinear cylindrical tubular sections 5 and 6 which are coupled together by means of a telescoped connection, the tubular end structures of the conductor sections including portions 5a, 6a which are so dimensioned as to provide a sliding telescoping fit therebetween to accommodate temperature-induced expansions and contractions of the conductor, and a flexible band 7 secured at its opposite ends to the telescoped end structures 5a, 6a for the purpose of assuring a low-ohmic interconnection between adjacent conductor sections. The conductor sections are joined together within the space provided by the interior of the coupling housing 9.

The casing section 1 is provided with a tubular extension 3 projecting beyond the end thereof and which is secured to the section 1 by any suitable means such as a circular weld. The other casing section 2 is similarly provided with a tubular extension 4 projecting beyond its end. Supported at the ends of the tubular extensions 3, 4 are disc-shaped insulators 8 having central openings through which the conductor sections 5, 6 pass with a sliding fit therebetween to allow for expansion and contraction.

Surrounding the tubular extension 3 of casing section 1 is a coupling sleeve 9a projecting from one end of the coupling housing 9, this sleeve being provided at one end with an external flanged portion 9c having a plurality of circumferentially spaced bores therethrough which receive screw bolts 9d for securing coupling sleeve 9a to the housing 9. The opposite end of sleeve 9a is provided with an inturned flanged portion 9e which contacts and centers the tubular extension 3. Located within the flanged portion 9e is a ring seal 9f to prevent ingress of dust and other particles into the annular gap 9g formed between the outer surface of the tubular extension 3 and the inner surface of the coupling sleeve 9a.

Located within the annular gap 9g is a seal tube 10 made from a flexible material impervious to gas and which is turned back upon itself to establish outer and inner portions 10a, 10b joined at the turn-back 10c and which rest in contact with the inner surface of sleeve 9a and the outer surface of tubular extension 3. The ends of the outer and inner portions 10a, 10b of the seal tube 10 are clamped respectively in place between the end flange 9c and coupling housing 9 and between the end face of the tubular extension 3 and a clamping ring 3a which includes a plurality of circumferentially spaced bores which receive screw bolts 3b that secure ring 3a to the end of the tubular extension 3. Clamping ring 3a also serves to seat insulator 8 in place against a shouldered portion of the tubular extension 3 thereby to hold the insulator securely in place.

A similarly constructed coupling sleeve 9a projects from the opposite end of the coupling housing 9 to surround the tubular extension 4 of the casing section 2 to establish an annular gap 9g in which is located another seal tube 10 that is held in place by clamping ring 4a corresponding to ring 3a.

The coupling housing 9 is provided with a cover 9b held in place by screw bolts 9h and which includes a fill hole 9i closed by a removable plug 11 and through which the insulating gas, e.g. $SF_6$ at a pressure of 4 atmospheres can be introduced to fill the volume between conductor sections 5, 6 and the casing components 1, 2, 3, 4 and 9.

In order to limit relative longitudinal displacement between the tubular extensions 3, 4 and the coupling sleeves 9a which take place as a result of temperature-induced expansions and contractions of the casing sections 1 and 2, the tubular extensions 3 and 4 are each provided with a laterally extending projection 12 screw-bolted thereto which is adapted to abut the end of coupling sleeve 9a after a predetermined travel of the tubular extension 3,4 within sleeve 9a. Travel of tubular extension 3, 4 in the opposite direction is limited by stop means provided by a spacer rod 13 secured at one end to and projecting from the end of coupling sleeve 9a and which extends through an opening in the projection 12. The opposite end of spacer rod 13 terminates in a threaded portion receiving a nut 14 which secures a washer 14a in place, the washer having a diameter greater than the opening through lateral projection 12 so as to establish a stop when the washer 14a abuts the projection 12 as the casing sections 1, 2 and their tubular extensions 3 and 4 move to the left and right respectively as viewed in FIG. 1.

In the case of comparatively long high-voltage conductors encapsulated in accordance with the invention it is not necessary to have the same number of expansion couplings for the casing as there are for the conductors.

Prior to filling the encapsulated high-voltage conductor line with the insulating gas, e.g. pressurized $SF_6$, it is first necessary to evacuate the casing in order to remove whatever moisture may exist within it. In so doing, a danger may exist that as a result of the reduction in pressure within the casing below atmospheric, the corresponding rise in pressure in the annular space 9g exerted upon the rolled-back end 10c of the sealing tube 10 by the external air pressure may cause this end to be inverted, i.e. pushed in, thereby resulting in an undesirable wrinkling of the tube during the subsequent filling of the casing with the pressurized insulating gas which could adversely affect its proper mode of operation. In order to avoid this possibility, the invention provides, in a further development, as illustrated in FIGS. 2 and 2a an internal support in the form of a sleeve which can be temporarily inserted into the space between the outer and inner portions 10a, 10b of the tube when evacuation of the casing takes place.

With reference now to FIGS. 2 and 2a, wherein components identical and structure and function with those in the embodiment of FIG. 1 carry the same reference numerals, it will be seen that housing 9 is provided at its opposite ends with bores 9k through each of which is passed with a close sliding fit a bolt 16 threaded on both ends. The inner end of each bolt 16 which terminates within housing 9 is secured by a nut 17 to a lateral projection 15a from one end of a support sleeve 15, the other end of this sleeve being insertable into the annular space between the outer and inner portions 10a, 10b of the double walled tube 10 from the withdrawn position shown in FIG. 2 to a temporary inserted position as depicted in FIG. 2a. For effecting movement of sleeves 15, the outer threaded end of each bolt 16 which projects to the exterior of housing 9 is provided with a nut 17' which when screwed down upon the bolt end bears against the housing 9 and thus draws the sleeves 15 into the space between the outer and inner portions of tube 10. A locking cap 18 provided with a seal ring is secured in place on housing 9 over the outer end of each bolt 16, as depicted in FIG. 2 in order to relieve the tight sliding seal between the bolt and the bore which receives it from pressure during operation of the encapsulated high-voltage conductor line. The cap 18 also prevents the bolt 16 and hence the tubular sleeve 15 from any possibility of moving from the withdrawn position depicted in FIG. 2 during operation of the conductor line.

I claim:

1. In an encapsulated high-voltage conductor structure in which the conductor is supported centrally within a grounded tubular casing by means of insulators, said casing being filled with a pressurized insulating gas and being divided longitudinally into rectilinear sections coupled together in essentially end-to-end relation by means of coupling joints which provide compensation for temperature-induced expansion and contraction of the casing, the improvement wherein each coupling joint is constituted by a housing including oppositely extending coupling sleeves into which the end portions of adjoining casing sections are inserted for a sliding guided movement as the sections expand or contract, there being interposed in an annular gap provided between the end portion of each casing section and the associated coupling sleeve a sealing means in the form of a flexible tube turned back upon itself to develop outer and inner portions and which are secured at one end respectively to said coupling sleeve and to the end portion of said casing section thereby to accommodate relative longitudinal displacement between the casing sections and coupling sleeves.

2. An encapsulated high-voltage conductor structure as defined in claim 1 wherein each coupling joint includes means limiting the extent of the relative longitudinal displacement between said coupling sleeves and the end portions of said casing sections.

3. An encapsulated high-voltage conductor structure as defined in claim 2 wherein said means limiting the extent of the relative longitudinal displacement between each coupling sleeve and the end portion of the associated casing section is constituted by a spacer rod arranged parallel therewith and which extends through an opening provided in a lateral extension on said casing section, one end of said spacer rod being secured to said coupling sleeve and the other end of said spacer rod terminating in an abutment for said lateral extension on said casing section.

4. An encapsulated high-voltage conductor structure as defined in claim 1 wherein each said coupling sleeve is provided with an outwardly turned flange at one end secured to said housing and an inturned flange at the opposite end establishing a slidable contact with the outer surface of said end portion of said casing section, the outer portion of said flexible sealing tube being clamped at the end opposite the turned-back end between said outwardly turned flange and said housing, and the inner portion of said flexible sealing tube being clamped at the end opposite the turned-back end between the end face of said casing section and a clamping ring secured thereto.

5. An encapsulated high-voltage conductor structure as defined in claim 4 wherein said clamping ring also functions to clamp a circular insulator in place on said end portion of said casing section, said circular insulator including a central bore through which said high-voltage conductor passes.

6. An encapsulated high-voltage conductor structure as defined in claim 1 wherein said conductor is also divided longitudinally into rectilinear sections coupled together in essentially end-to-end relation by means of coupling joints which provide compensation for temperature-induced expansion and contraction of said conductor, said compensating coupling joints for the sections of said conductor being located within said housing and being operable independently of the operation of the said temperature compensating coupling joints for said casing sections.

7. An encapsulated high-voltage conductor structure as defined in claim 6 and wherein said coupling joints for the ends of adjoining conductor sections include telescoping sleeve portions thereon and a flexible band connection located within said telescoped sleeve portions, the opposite ends of said band being secured respectively to the ends of said adjoining conductor sections.

8. An encapsulated high-voltage conductor structure as defined in claim 1 and which further includes a sleeve located within said housing and which is actuatable from the exterior of said housing into the annular space between said outer and inner portions of said flexible sealing tube in the direction of the turned-back end thereof so as to engage and support the latter to prevent any inversion of said tube during evacuation of said casing preparatory to filling with the insulating gas.

9. An encapsulated high-voltage conductor structure as defined in claim 8 wherein said tube supporting sleeve includes a lateral projection to which is secured an actuating bolt extending through a bore in the wall of said housing with a close sliding fit to the exterior.

10. An encapsulated high-voltage conductor structure as defined in claim 9 wherein the exterior end of said bolt is threaded to receive an actuating nut and which is covered by a cap to seal the bore against escapage of insulating gas.

* * * * *